US010503767B2

(12) United States Patent
Van Hoof et al.

(10) Patent No.: US 10,503,767 B2
(45) Date of Patent: Dec. 10, 2019

(54) COMPUTERIZED NATURAL LANGUAGE QUERY INTENT DISPATCHING

(71) Applicant: Microsoft Technology Licensing, LLC, Redmond, WA (US)

(72) Inventors: Hubert Van Hoof, Seattle, WA (US); David J. Brennan, Redmond, WA (US); Vidyaraman Sankaranarayanan, Bellevue, WA (US); Ruchita Bhargava, Redmond, WA (US); Roberto Sonnino, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 580 days.

(21) Appl. No.: 15/264,568

(22) Filed: Sep. 13, 2016

(65) Prior Publication Data

US 2018/0075131 A1    Mar. 15, 2018

(51) Int. Cl.
*G06F 16/00* (2019.01)
*G06F 16/33* (2019.01)
(Continued)

(52) U.S. Cl.
CPC ...... *G06F 16/3334* (2019.01); *G06F 16/2471* (2019.01); *G06F 16/3329* (2019.01);
(Continued)

(58) Field of Classification Search
CPC ............. G06F 16/3334; G06F 16/3329; G06F 16/2471; G06F 16/3344; G06F 16/332;
(Continued)

(56) References Cited

U.S. PATENT DOCUMENTS 5,864,683 A    1/1999  Boebert et al.
6,691,151 B1 *  2/2004  Cheyer ............... G06F 9/465
                                         709/202

(Continued)

FOREIGN PATENT DOCUMENTS

WO    2009145796 A1    12/2009
WO    2016004266 A2     1/2016

OTHER PUBLICATIONS

"Non Final Office Action Issued in U.S. Appl. No. 15/264,575", dated Nov. 1, 2018, 32 Pages.
(Continued)

*Primary Examiner* — Anh Ly
(74) *Attorney, Agent, or Firm* — Goff IP Law PLLC; Jared Goff

(57) ABSTRACT

A natural language query can be processed via a main natural language processor. A request to produce an intent of the query can be dispatched from the main natural language processor to an extension natural language processor. An intent of the query can be generated via the extension natural language processor in response to the dispatched request, with the generating of the intent being performed independently of the main natural language processor. The intent of the natural language query can be passed from the extension natural language processor to the main natural language processor in response to the request to produce the intent of the query. A selection of a conversation query processor for responding to the intent can be produced via the main natural language processor. Additionally, an instruction to respond to the intent of the query can be passed to the selected conversation query processor.

20 Claims, 4 Drawing Sheets

(51) Int. Cl.
*G06N 7/00* (2006.01)
*G06F 17/27* (2006.01)
*G06F 16/2458* (2019.01)
*G06F 16/332* (2019.01)

(52) U.S. Cl.
CPC ........ *G06F 16/3344* (2019.01); *G06F 17/274* (2013.01); *G06F 17/2705* (2013.01); *G06F 17/279* (2013.01); *G06N 7/005* (2013.01)

(58) Field of Classification Search
CPC .. G06F 16/2458; G06F 17/279; G06F 17/274; G06F 17/2705; G06F 17/2785; G06N 7/005; G10L 17/06; G10L 15/1815; G10L 15/882; G10L 15/26; H04N 21/8133; H04N 21/2187
See application file for complete search history.

(56) References Cited

U.S. PATENT DOCUMENTS

| | | | |
|---|---|---|---|
| 7,254,539 B2 | 8/2007 | Carberry et al. | |
| 7,869,998 B1 | 1/2011 | Di Fabbrizio et al. | |
| 7,949,529 B2 | 5/2011 | Weider et al. | |
| 8,073,681 B2 | 12/2011 | Baldwin et al. | |
| 8,670,979 B2 | 3/2014 | Gruber et al. | |
| 8,677,377 B2 | 3/2014 | Cheyer et al. | |
| 8,731,939 B1 | 5/2014 | Lebeau et al. | |
| 2005/0256700 A1* | 11/2005 | Moldovan | G06F 17/271 704/9 |
| 2008/0221892 A1* | 9/2008 | Nathan | G06F 17/279 704/257 |
| 2009/0089273 A1* | 4/2009 | Hicks | G06Q 30/02 707/E17.002 |
| 2009/0089314 A1* | 4/2009 | Hicks | G06Q 30/0603 707/E17.002 |
| 2010/0235378 A1* | 9/2010 | Armstrong | G06Q 10/10 707/769 |
| 2011/0112827 A1* | 5/2011 | Kennewick | G10L 15/18 704/9 |
| 2011/0112921 A1* | 5/2011 | Kennewick | G06Q 30/0601 705/26.1 |
| 2011/0131045 A1 | 6/2011 | Cristo et al. | |
| 2012/0136649 A1 | 5/2012 | Freising et al. | |
| 2013/0262595 A1* | 10/2013 | Srikrishna | G06F 16/38 709/206 |
| 2014/0040312 A1* | 2/2014 | Gorman | G06F 17/2785 707/771 |
| 2014/0188478 A1* | 7/2014 | Zhang | G10L 15/22 704/257 |
| 2014/0188835 A1* | 7/2014 | Zhang | G06F 17/2705 707/706 |
| 2014/0250145 A1* | 9/2014 | Jones | G06Q 10/101 707/769 |
| 2014/0337383 A1* | 11/2014 | Boyle | G06F 16/243 707/780 |
| 2014/0365209 A1* | 12/2014 | Evermann | G06F 17/279 704/9 |
| 2015/0066479 A1* | 3/2015 | Pasupalak | G06F 17/27 704/9 |
| 2015/0186504 A1* | 7/2015 | Gorman | G06F 16/24522 707/752 |
| 2015/0279366 A1* | 10/2015 | Krestnikov | H04W 4/70 704/235 |

OTHER PUBLICATIONS

Van Hoof, et al., "Natural Language Processor Extension Transmission Data Protection", U.S. Appl. No. 15/264,575, filed Sep. 13, 2016, 48 Pages.

Lee, et al., "Example-based dialog modeling for practical multi-domain dialog system", In Journal of Speech Communication, vol. 51, Issue 5, May 2009, pp. 466-484.

Allen, et al., "An Architecture for a Generic Dialogue Shell", In Journal of Natural Language Engineering, vol. 6, Issue 3-4, Sep. 2000, pp. 1-23.

Bohus, et al., "RavenClaw—Dialog Management Using Hierarchical Task Decomposition and an Expectation Agenda", In Proceedings of 8th European Conference on Speech Communication and Technology, Sep. 1, 2003, 5 pages.

Han, et al., "NLify—Third-Party Programming Support for Spoken Natural Language Interfaces", In Technical Report MSR-TR-2012-128, Dec. 2012, pp. 1-14.

"International Search Report and Written Opinion Issued in PCT Application No. PCT/US2017/050571", dated Nov. 30, 2017, 13 Pages.

Nakano, et al., "A Multi-Expert Model for Dialogue and Behavior Control of Conversational", In Journal of Knowledge-Based Systems, vol. 24, Issue 2, Mar. 2011, pp. 248-256.

* cited by examiner

COMPUTERIZED NATURAL LANGUAGE QUERY INTENT DISPATCHING

BACKGROUND

Many natural language conversational computer systems have included a main natural language processor. A main natural language processor is a computer component that operates to automatically interact using a natural language dialog, which can include receiving natural language queries, processing those queries, and responding with natural language dialog scripts. The processing of the queries can include identifying an intent of a received natural language query, as well as possibly one or more entities for the natural language query. As used herein, an "intent" is computer-readable data that represents what a computer system component has identified as a meaning that was intended by a natural language query. An "entity" in this context is computer-readable data that represents one or more details identified by the computer system for an identified intent. A natural language is a language used in natural conversation between human beings, such as Mandarin Chinese, Spanish, English, Hindi, Arabic, Portuguese, Japanese, German, French, etc. Natural language can also include language modifications that are used in natural conversation between human beings in various different contexts, such as digital messaging conversations, in-person conversations, etc. For example, such modifications may include mixtures of formal languages, abbreviations, and/or slang.

In some configurations, a main natural language processor may invoke a conversation query processor, which is a computer component that can handle at least a portion of a response to a natural language query when instructed to do so by a main natural language processor. This is often done by having a main natural language processor use a grammar that has one or more slots to be filled with keywords. For example, a natural language query may say "ask App X to call a cab." Such a statement may match a grammar that says, "ask _ to _", with the underlined portions representing slots. The main natural language processor can recognize that the natural language query fits the form of the grammar, so that the natural language query is recognized as having the intent of invoking the application called "App X" to do something, in this case "call a cab." Thus, the main natural language processor can invoke the App X conversation query processor and pass to it an intent and possibly one or more entities, which instruct App X to initiate an operation for calling a cab.

SUMMARY

The tools and techniques discussed herein for computerized natural language intent dispatching can allow the main natural language processor to dispatch intent determinations to one or more extension natural language processors. This shift in the computer architecture and operation for a natural language conversation computer system can improve such a computer system in one or more ways that will be discussed below.

In one aspect, the tools and techniques can include processing a natural language query via a main natural language processor. A request to produce an intent of the query can be dispatched from the main natural language processor to an extension natural language processor. An intent of the query can be generated via the extension natural language processor in response to the dispatched request, with the generating of the intent being performed independently of the main natural language processor. The intent of the natural language query can be passed from the extension natural language processor to the main natural language processor in response to the request to produce the intent of the query. A computer-readable selection of a conversation query processor for responding to the intent can be produced via the main natural language processor. Additionally, a computer-readable instruction to respond to the intent of the query can be passed to the selected conversation query processor, with the computer-readable instruction identifying the intent of the query.

In another aspect of the tools and techniques, a natural language query can be processed via a main natural language processor, with the processing comprising producing a plurality of requests to produce an intent of the query. The requests to produce the intent of the query can be dispatched from the main natural language processor to a set of extension natural language processors, with the set of extension natural language processors each being configured to generate an intent of the query independently of the main natural language processor. The requests may also be dispatched to other extension natural language processors that are not configured to generate an intent of the query, where some receiving extension natural language processors are programmed to understand and produce an intent for the query, while other receiving extension natural language processors are not programmed to understand and produce and intent for this particular query. An intent of the natural language query can be received from each of the extension natural language processors in the set, in response to the sending of the requests to produce an intent of the extension natural language processor. A computer-readable selection of a selected intent of the received intents and a computer-readable selection of a selected conversation query processor matching the selected intent can be produced. A computer-readable instruction to respond to the selected intent of the query can be passed from the main natural language processor to the selected conversation query processor. The computer-readable instruction can identify the selected intent of the query.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
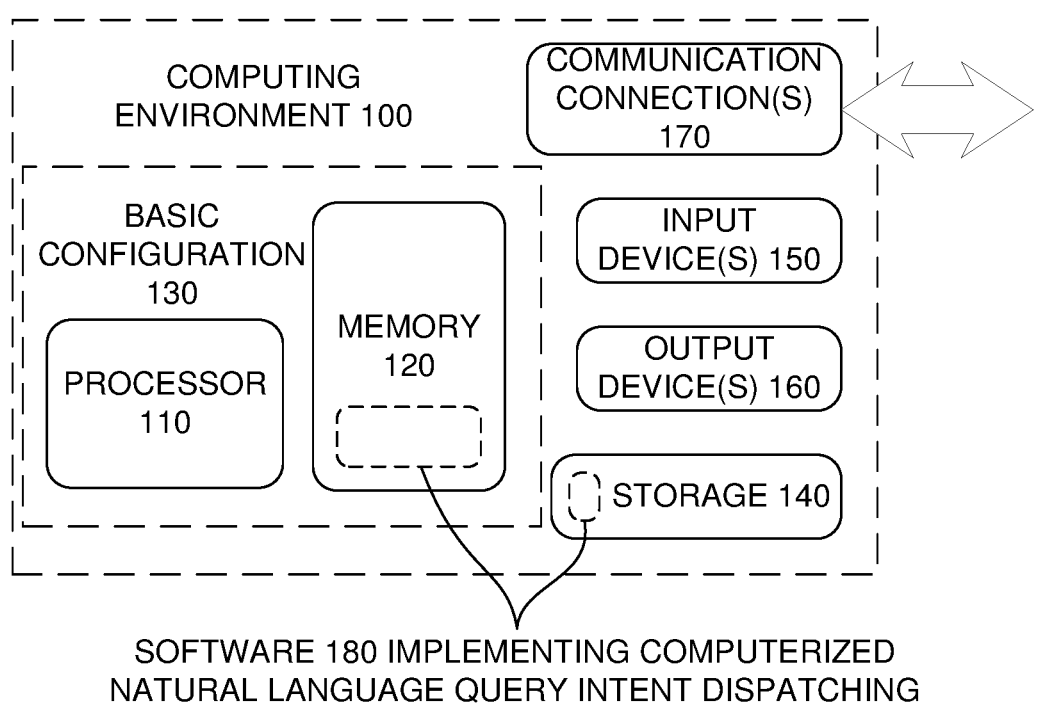
FIG. 1 is a block diagram of a suitable computing environment in which one or more of the described aspects may be implemented.

Aspects described herein are directed to techniques and tools for computerized natural language query intent dispatching. Such improvements may result from the use of various techniques and tools separately or in combination.

Such techniques and tools may include a natural language conversational computer system with an extensible registration of intent matchers, or extension natural language processors, that is able to match a particular natural language query to an intent from a plurality of intent matchers, and route the intent to the appropriate conversation query processor.

For example, for a user query reading "I am hungry", the system may match this query with multiple extension natural language processors that can process the query and produce an intent of the query (e.g., order pizza, order coffee). Each of the extension natural language processors can be a natural language processor that is independent of the main natural language processor of the system, and that can return at least one intent and may also return one or more entities for a natural language query. Each extension natural language processor may also have one or more of the following features: the extension natural language processor does not rely on an awareness of the other processors to generate intents; and/or the extension natural language processor is able to use its own form of natural language matching of natural language queries with intents to identify the intent(s) of the query. The system may also provide ways of disambiguating between multiple intent matchers and/or conversation query processors by the use of data such as user rankings, user preferences, context information and/or user profiles, and possibly receiving user input selections, such as selections between different intents and/or different conversation query processors.

Accordingly, the tools and techniques herein, used in a natural language conversational system, can address a common problem of how to effectively route a conversation to a particular conversational query processor (e.g. a processor for weather reports, a processor for ordering food, etc.). Current architectures for natural language conversation computer systems can be difficult to extend to include additional computer components, such as to work with additional conversation query processors and/or to recognize additional intents of conversational queries. Additionally, the conversation involved in a main natural language processor invoking a specific conversation query processor can seem rigid, unnatural, and inefficient. A computer system using the tools and techniques herein can use a main natural language processor to dispatch a query to extension natural language processors for determining intents of the query, and may use the intents to route a conversation to a particular conversational query processor (e.g. a conversational query processor for weather, a conversational query processor for ordering a pizza, etc.). This may be done without requiring a central query-to-intent matching system (e.g., a central regular expression table and/or a central arbitrator for producing intents from queries) and/or without requiring explicit user cues identifying a desired conversation query processor (e.g., where the natural language query must say "*ask App X* to call a cab").

Accordingly, one or more substantial benefits can be realized from the natural language query intent dispatching tools and techniques described herein. For example, additional extensions may be added for use with to a main natural language processor, where each such extension includes an extension natural language processor for intent matching, and may also include a natural language query processor for assisting in responding intents of queries. Such extensions may be added to the system without adding functionality for the intent matching within the main natural language processor, providing for more efficient expansions of capabilities of the natural language conversational system. Also, the intent matching and the assigning of intents to query processors may be performed by the system without requiring explicit natural language query identification of a particular query processor, thereby allowing for a more effective and natural conversational computer system. This can also improve the efficiency of the computer system in handling natural language queries by providing for extensions to the system without modifying the core operation of the main natural language processor, and/or by providing a system that is able to handle a wider variety of natural language queries that are to be handled by components that are separate and/or operate independently from the main natural language processor.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described aspects may be implemented. For example, one or more such computing environments can be used as a client device and/or a device in a service for providing natural language conversational computer features. Generally, various different computing system configurations can be used.

Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing natural language query intent dispatching. An implementation of natural language query intent dispatching may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Natural Language Conversational Computer System

Figure 2:
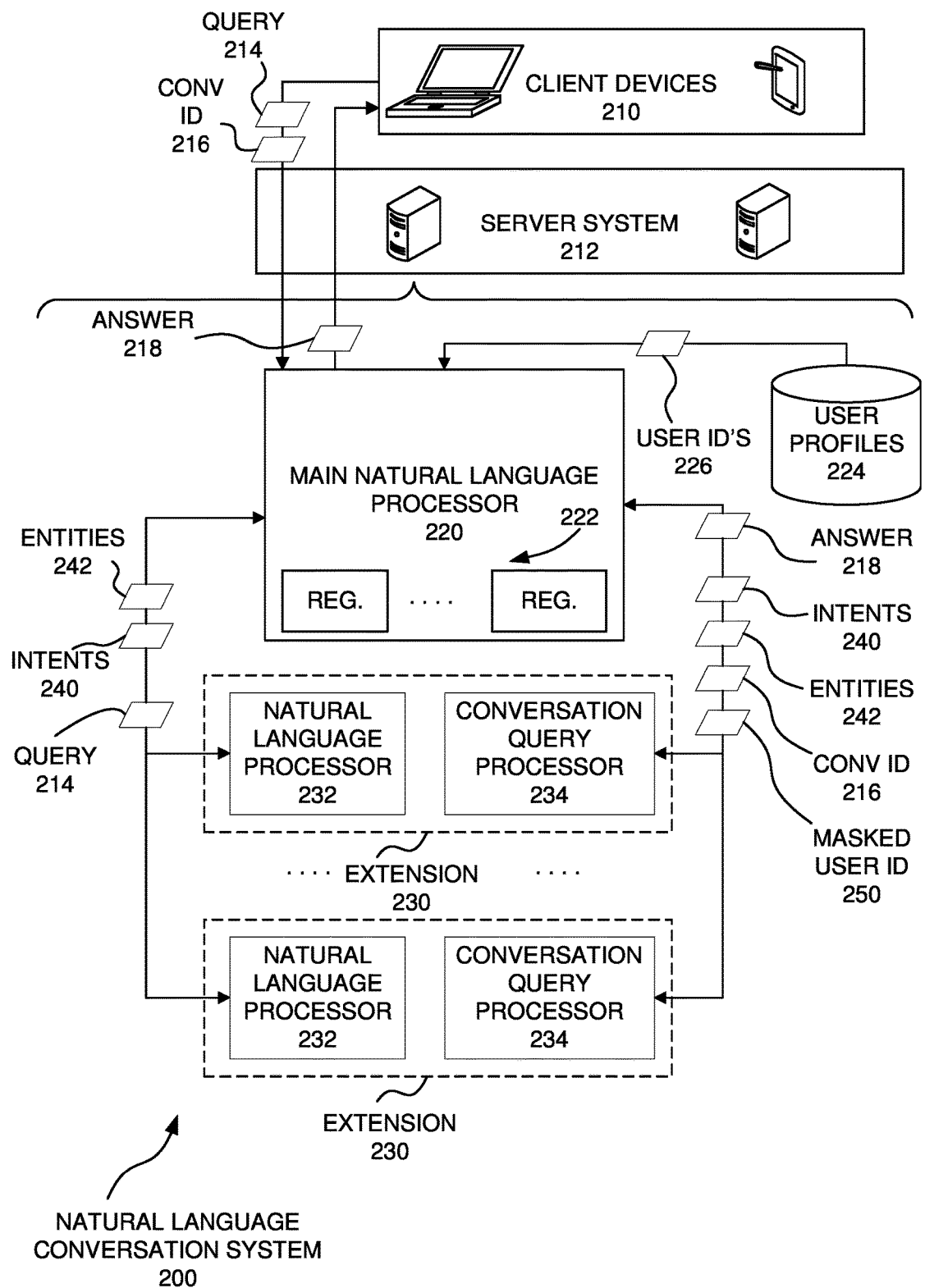
FIG. 2 is schematic diagram of a natural language conversational system.

FIG. 2 is a schematic diagram of a natural language conversational computer system (200) in conjunction with which one or more of the described aspects may be implemented.

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

Referring now to FIG. 2, components of the computer system (200) will be discussed. Each of the computer components discussed herein includes hardware, and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Referring still to FIG. 2, the computer system (200) can include one or more client devices (210), and a server system (212), which itself includes multiple components discussed below.

A. Client Devices

Each client device (210) can produce a natural language input from the user's input, such as voice input, text input, sign language input, or other gestural input, and can forward the input in the form of a natural language query (214) (which may be a question, statement, etc.), and the client device (210) may also output a conversation identifier (216) corresponding to a conversation that includes the associated query (214). Specifically, a client device (210) can send the query (214) to the server system (212), and can receive back a computer-readable answer (218). The client device (210) can present the natural language answer (218) in the form of a visual display and/or voice output on a computer display and/or speaker. For example, the presented natural language can be in the form of output cards or plain visual and/or audio natural language.

As an example, a possible protocol for integration of the server system (212) with the client devices (210) could be through the use of structured JSON requests and/or responses. With such a protocol, different client devices (210) could parse the JSON response answers (218), with different clients producing different displays as determined by the client devices (210). Alternatively, a different protocol could be used, where the server system (212) could dictate all or part of the visual layout of displays of the answers (218), such as using one or more Web user interface languages (e.g., HTML, CSS, and/or Java Script). Accordingly, the answers (218) may be in the form of digital "cards", which are used in existing natural language systems. The answers (218) presented on the client devices (210) may be interactive (such as including displayed controls or other interactive elements) or non-interactive. As discussed above, the layout of the displays of the answers (218) may be dictated by the client devices (210) and/or by one or more components of the server system (212). Additionally, as with other digital communications discussed herein, the answer (218) may be modified by different components as it is passed through components in the natural language conversation system (200), and can still be considered to be the same answer (218).

B. Main Natural Language Processor

The server system (212) can include a main natural language processor (220). The main natural language processor (220) can receive natural language queries (214) and conversation identifiers (216), can process those queries (214), and can respond in an automated manner with natural language answers (218). For some queries (214), the main natural language processor (220) may identify or generate intents of the queries (214) and possibly also identify or generate entities for those intents within the main natural language processor (220). The main natural language processor (220) may also generate responses to the queries using those intents and entities.

The main natural language processor (220) can access and/or manage computer readable user profiles (224), which may include user identifications (226). The user profiles (224) may include other computer-readable data, such as data indicating preferences of the user profile (224). The main natural language processor (220) may use such user profiles (224) in formulating answers to queries. Profile data may also come from a client device (210), such as location or other sensor data from a client device (210). In some scenarios, a user could choose to only keep profile data on a client device (210) or in an independent profile store (indeed, some or all of the user profiles (224) may be in such an independent profile store), and only provide certain data based on parameters such as location, time, or query type.

The main natural language processor (220) can include registrations (222) of extensions (330). For example, each registration (222) can include data instructing the main natural language processor (220) to interact with the corresponding extension (230), and possibly also including details as to how such interaction is to occur (such as by including identifiers and/or addresses for the extensions (230), details of protocols to be used in communicating with the extensions (230), etc.). For some queries (214), the main natural language processor (220) may not be equipped to produce intents and entities on its own (or at least not with a predetermined level of confidence). For producing such intents and entities, the main natural language processor (220) can dispatch the received query to an extension (230). Additional features of the main natural language processor (220) in interacting with the extensions (230) will be discussed below in the discussions of the components of the extensions. If the use of the extensions (230) does not produce a specific answer to a query (such as where none of the extensions are able to produce an intent of the query with sufficient confidence), the main natural language processor (220) may fall back on a default action, such as returning Web search results as an answer to a query.

C. Extensions

The extensions (230) could be pre-registered with the main natural language processor (220), such as where the extension (230) is developed and registered as part of the initial development of the main natural language processor (220). As another example, an extension (230) could be available from an online marketplace or gallery of extensions, and could be registered with the main natural language processor (220) after the main natural language processor (220) is initially developed and running. As another example, an extension (230) could be developed specifically for a particular tenant such as a company profile, and could be registered with the main natural language processor (220) after the main natural language processor (220) is initially developed and running.

Each extension may include an extension natural language processor (232) and may also include a conversation query processor (234). An extension (230) may also include additional components and/or data, such as metadata for the extension, a title, a logo, a description of the extension, etc. For some extensions, the functions of the conversation query processor (234) may be performed internally within the main natural language processor (220) so that the extension (230) outside the main natural language processor does not include a conversation query processor (234), but still includes the extension natural language processor (232). Features of the extension natural language processors (232) and the conversation query processors (234) are discussed below.

D. Extension Natural Language Processors

The natural language processor (232) for an extension (230) is a component that can receive a natural language query (214), process the query (214), and return an intent (240) of the query (214), and possibly also one or more entities (242) for the intent (240). The extension natural language processors (232) for different extensions (230) can operate independent of the main natural language processor (220), such that each extension natural language processor (232) can operate without an awareness of internal operations of the main natural language processor (220). Also, different extension natural language processors (232) for different extensions (230) can operate independent of each other, such that each extension natural language processor (232) can operate without an awareness of internal operations of other extension natural language processors (232). However, the extension natural language processors (232) may still utilize some common components, such as a main natural language understanding component having multiple different endpoints for different extension natural language processors (232). Alternatively, different extension natural language processors (232) may utilize separate and different language understanding components.

As an example, a pre-existing language understanding component may be invoked by passing the natural language text (and possibly other information such as a key and a conversation identifier (216)) to the component with a request to return intents (240) and possibly entities (242) representing the meaning(s) of the natural language text. Different keys and/or application identifiers submitted to the language understanding component may be used for different natural languages, thereby signaling to the language understanding component which language is being used. The language understanding component may include one or more known components for natural language understanding. For example, the language understanding component may utilize a lexicon of the natural language, as well as a parser and grammar rules to break each natural language phrase into a data representation of the phrase. The language understanding component may also utilize a semantic theory to guide comprehension, such as a theory based on naïve semantics, stochastic semantic analysis, and/or pragmatics to derive meaning from context. Also, the language understanding component may incorporate logical inference techniques such as by mapping a derived meaning into a set of assertions in predicate logic, and then using logical deduction to arrive at conclusions as to the meaning of the text. Using results of such language understanding techniques, the language understanding component can map the resulting derived meanings to one or more intents (240) and/or entities (242) to be passed back to the main natural language processor (220), as discussed above. The extension natural language processors (232) may also produce confidence scores for the returned intents (240), with such confidence scores quantifying the strength of the functions of the extension natural language processor (232) in mapping the query (214) onto the returned intent (240).

While an extension natural language processor (232) may use a common underlying language understanding component, each extension natural language processor (232) may be developed in a personalized manner for the type of extension being developed. For example, such development may include defining an intent model in a programming language that is supported by the language understanding component, with the language understanding component serving as a platform on which different extension natural language processors (232) can be built in a standard way. For example, an extension for handling greetings may be programmed to use the language understanding component to produce intents and entities in response to typical greetings (e.g., "Hello", "How are you doing today?", etc.). As another example, an extension for ordering a pizza can be programmed to use the language understanding component to produce intents and entities in response to typical commands dealing with pizza ordering (e.g., "I am hungry", "I want a pizza", "Get me a pepperoni pizza?", "Where can I get a pizza?", etc.). Such programming of an extension natural language processor (232) can be performed independently of development of the main natural language processor (220), with the main natural language processor (220) merely utilizing the data in a registration (222) for the extension natural language processor (232). Accordingly, this architecture can provide for added efficiency and flexibility in developing and maintaining additional capabilities of the natural language conversation system (200), and in the operation of the natural language conversation system (200).

The extension natural language processors (232) in the architecture of the natural language conversation system (200), whether installed in the natural language conversation system (200) directly or from a marketplace, can operate as translators between user input and task input, such as between natural language queries (214) and intents (240) of the natural language queries (214) (possibly also producing entities (242)). With the extension natural language processors (232) being independent of the main natural language processor (220), issues such as data storage issues, data compliance issues, and bandwidth issues can be handled by developers of the extensions (230). Additionally, developers and/or managers of the extension natural language processors (232) can control and improve their own developed extension natural language processors (232) as they see fit for their own extension (230), largely independent of development of the main natural language processor (220).

The extension natural language processors (232) may be grouped in categories with shared intents. For example, "turn on the light" may be a single intent for a "Lighting" extension. That Lighting extension may route the intent to an appropriate system for a light fixture in a location of the client device (210) that produced the associated query (214). For example, such routing may be performed by the conversation query processor (234) for the extension (230). Data indicating such a location can be sent from the client device (210) along with the query (214) (such as with a query stating, "Turn on the lights."). Such data from the client device (210) may be considered profile data (indicating the location of the user profile (224), such as the location of the client device (210) the user profile (224) is using to interact with the server system (212).

E. Selection of an Intent and a Conversation Query Processor by the Main Natural Language Processor The main natural language processor (220) can receive the intents (240) and entities (242) from the extension natural language processors (232). In some instances, only a single intent from a single extension natural language processor (232) may be returned to the main natural language processor (220) for a particular query (214). In other instances, no matching intents (240) may be returned for a particular query (214), and the main natural language processor (220) can resort to a default action, as discussed above. In yet other instances, multiple intents (240) can be returned from multiple different extension natural language processors (232).

For example, the main natural language processor (220) may have sent the query (214) to a large set of extension natural language processors (232), and only a subset of those extension natural language processors (232) may be capable of understanding that particular query (214) and returning a corresponding intent (240). As an example, if the main natural language processor (220) sends a query (214) that reads, "I am hungry" to multiple different extension natural language processors (232), an extension natural language processor for a pizza ordering extension may be programmed to return an intent for that query, and another extension natural language processor for making reservations at a restaurant may be programmed to return an intent for that query, but an extension natural language processor for an extension that schedules rides in taxi cabs may not be programmed to return an intent for that query. Thus, the main natural language processor (220) may send the query to all three extension natural language processors (232), but it may only receive back an "order a pizza" intent from the pizza ordering extension natural language processor and a "make a reservation" intent from restaurant reservation extension natural language processor.

The main natural language processor (220) can match an intent (240) with a corresponding conversation query processor (234). For example, the extension natural language processor (232) may be part of the same extension (230) as the corresponding conversation query processor (234), as indicated to the main natural language processor (220) in the registration (222) for that extension (230). Thus, upon receiving an intent (240) from a particular extension natural language processor (232), the main natural language processor (220) may look up the registration (222) for that extension natural language processor's extension (230) to find data regarding the corresponding conversation query processor (234). As another example, along with returning the intent (240), the extension natural language processor may also return an identifier (such as an address, etc.) for the conversation query processor (234) that is to process that intent (240). The main natural language processor (220) can use such an identifier to match the received intent (240) with the matching conversation query processor (234).

Where multiple intents (240) are received from multiple extension natural language processors (232) for a single query (214), the main natural language processor (220) can select an intent (240) and can match that selected intent (240) with a corresponding conversation query processor (234) for the intent (240), to also select the conversation query processor (234) for handling a response to the query (214). This selection of an intent (240) from among multiple different intents (240) can involve disambiguation from among the multiple intents (240). This disambiguation to select an intent (240) by the main natural language processor (220) can include factoring in multiple different signals or data items regarding the multiple different intents (240) being considered, to produce scores for different intents (240).

For example, different factors can be weighted and combined, such as by summing together multiple different weighted scores for different factors for each intent (240) being considered. For example, these factors can include policy-based factors (which may include rankings of different options by one or more administrative users and/or computer-readable rules to be applied to other factors), contextual information (such as location of the client device (210), preferences of a user profile (224) currently logged in at the client device (210) and sending the query (214), current budget levels, etc.), past user inputs choosing intents, confidence levels for the intents (240) provided by the extension natural language processors (232) along with the intents (240) (especially if such confidence levels can be verified to be consistent with each other by the main natural language processor (220)), and/or other factors.

As an example of such other factors, intents (240) can be prioritized based on tiers of the extension natural language processors (232) that produced and provided the respective intents. For example, the tiers may include a first party extension natural language processor tier and a third party extension natural language processor tier, with the intent selection favoring those intents produced and provided by the extension natural language processors (232) in the first party extension natural language processor tier.

The use of different factors and/or weights for the factors may be set initially, and may be modified over time, such as by tuning a computer-readable selection model using a machine learning feedback loop. The scores for different intents (240) produced by combining quantities for such factors can be ranked to produce a ranking of the intents (240). In some instances, a top ranked intent (240) may be automatically selected. In other instances, the ranking may be used by the main natural language processor (220) to formulate an answer (218) that requests input from the client device (210) (user input) selecting one of the intents (240). That answer (218) can provide choices of available intents (240) in an order of their ranking, allowing user input from the client device (210) to select an intent (240) from the available intents (240). Such an answer (218) may exclude one or more available intents whose scores fall below a specified threshold, such as a set score threshold or a threshold below a specified number of intents (240) (e.g., excluding all but the top five ranked intents (240)). The main natural language processor (220) may determine whether to request user input for selection of the intent (240) in an answer (218), based on the ranking scores of the different intents (240). For example, the main natural language processor (220) may request user input if a difference between scores of the top two intents (240) is not as great as a predetermined amount, and/or if a score of a top scoring intent (240) is not above a predetermined threshold.

Thus an intent (240) can be selected as the only intent (240) available, an intent (240) may be selected as a top intent from rankings performed by the main natural language processor (220), or an intent may be selected by user input data from a client device (210). In any of these instances, the main natural language processor (220) can match the chosen intent with a conversation query processor (234) for handling the query (214) for the selected intent (240), as discussed above.

The main natural language processor (220) can also send the selected intent (240) along with other corresponding data to the selected conversation query processor (234). For example, this other data can include one or more entities (242) for the selected intent (240), a conversation identifier (216), a masked user identifier (250), and/or other data.

The masked user identifier (250) can be masked (altered to hide the underlying identifier from which the masked user identifier (250) is derived) to protect privacy of a corresponding user's information. For example, a masked user identifier (250) for a user profile (224) can be a randomly generated globally unique identifier associated with the user profile (224) (and possibly also associated with a particular extension (230), so that the globally unique identifier is specific to the extension (230) and specific to the user profile (224)) by the main natural language processor (220). As another example, a user identification (226) can be hashed using a standard hashing function (such as a hashing function based on SHA-1 or MD5), and the resulting hash can be sent as the masked user identifier (250). For either example, the masked user identifier (250) can be particular to an extension (230), which may include being specific to the conversation query processor (234) that is receiving the masked user identifier (250). This can inhibit those managing a particular conversation query processor (234) from effectively sharing information about particular user identifiers with those managing other conversation query processors (234). For example, in the hashing example above the main natural language processor (220) can have a different identifier for each extension (230), and that different identifier can be input into the hashing function along with the user identification (226) (where the identifier for the extension (230) can be a "salt" value in the hashing function). However, the conversation query processor (234) can still track the masked user identifier (250) to provide personalized processing and responses for particular user profiles, such as by tracking preferences of particular user profiles that have previously used the conversation query processor (234).

F. Conversation Query Processor

Each conversation query processor (234) is configured to accept and process an intent (240) and possibly other corresponding computer-readable data, such as one or more entities (242), a conversation identifier (216), and/or a masked user identifier (250). Upon processing this data, the conversation query processor (234) can generate an answer (218) that is responsive to the entity (242) and possibly responsive to the other received data. The conversation query processor (234) can operate and be developed independently of the main natural language processor (220), although a conversation query processor (234) may be integrated with the main natural language processor (220) in some configurations. The main natural language processor (220) may monitor the interaction with the conversation query processor (234) and/or the natural language processor (232), and intervene in certain situations. For example, the main natural language processor (220) may intervene in response to a query (214) saying "cancel this conversation" or "place this conversation on hold", even if the query (214) is directed to a conversation query processor (234). Such intervention by the main natural language processor (220) can provide the user profile (224) with an escape hatch to end or suspend a conversation with an extension (230). The main natural language processor (220) may also generate and maintain records of histories of conversations with the extensions. Such history records may be used by the natural language processor (220) and the extensions (230) to resume conversations that have been suspended.

A conversation query processor (234) can map the received intent (240) and possibly a combination of other received data onto a computer-readable answer (218). The generation of the answer (218) may also include filling in slots in one or more pre-defined statements stored in the server system (212). For example, an answer (218) from the conversation query processor (234) can provide a natural language script for an answer (218), with the natural language script being computer data representing the natural language of the answer (218). The answer may be sent from the conversation query processor (234) to the requesting client device (210) without being handled by the main natural language processor (220). Alternatively, the main natural language processor (220) may receive the answer (218) and send the answer (218) to the client device (210). Additionally, the main natural language processor (220) may modify the answer (218) before sending the answer (218) to the client device (210). For example, the main natural language processor (220) may add features to the answer, such as adding controls (such as buttons that can be selected to provide responses, such as a "YES" button and a "NO" button to allow user input to provide an answer to a yes/no question in the answer (218)).

The conversation query processor (234) may provide data representing visual features for an answer (218) that is to be displayed on a computer display of a client device (210). Also, for answers (218) that are to be audibly played, textual data may be translated to speech using a text-to-speech component in the conversation query processor (234), the main natural language processor (220), the client device (210), and/or elsewhere in the natural language conversation system (200). Likewise, for voiced user input into the client devices (210), such voiced input may be translated to textual data using a speech-to-text component in the client device (210), the main natural language processor (220), in an extension natural language processor (232), and/or elsewhere in the natural language conversation system (200).

In addition to providing an answer (218) that is responsive to a received intent (240), the conversation query processor (234) may perform on more tasks requested by the intent (240). For example, if the intent is asking to order a pizza, the task may actually enter the order for the pizza (the performance of the task) in addition to sending a natural language answer (218), confirming that the pizza has been ordered. In some instances, a task performed by the conversation query processor (234) may be to instruct another component to perform a task. For example, if the conversation query processor (234) is not configured to enter a pizza order itself or process payment for the pizza, it may perform the task by requesting that another computer component enter the pizza order or process the payment.

Optionally the conversation query processor (234) may request profile data (name, email, phone number, etc.) and/or context data (location, time zone, calendar), which can allow the conversation query processor (234) to provide better answers (218) and/or to be better able to perform tasks in a manner that matches the profile and context data. These data requests can be mediated by the main natural language processor (220). Specifically, the main natural language processor (220) may either allow such a request and provide requested information, or deny the request. For example, the main natural language processor (220) may send to the client device a request for the conversation query processor (234) to have access to the requested information, with this request describing the type of data to which access requested and also describing the requesting extension (230). Some extensions (230) may be pre-approved or pre-denied for access to specified types of data by policy when installed or subsequent to installation.

G. Multi-Turn Conversation Processing

The extensions (230) can be configured to store representations of the state of a conversation, and to handle multi-turn conversations using the intents (240) discussed above. For example, such a representation of state may be maintained and updated by the conversation query processor (234) for an extension (230) and may also be accessible by the extension natural language processor (232) for that same extension (230).

In one aspect, an extension natural language processor (232) may include a service that receives and processes a conversation identifier (216) and returns data identifying an endpoint of a language understanding component to act as an extension natural language processor (232) for that particular query (214) in a conversation. The extension (230) can track a state of a conversation, and return data for a different endpoint of the language understanding component (which can be considered to still be part of the same extension natural language processor (232), but with the extension natural language processor (232) operating in a different mode for different states of the conversation) for different states of the conversation. Thus, the extension natural language processor (232) can operate differently for different turns of the conversation.

H. Example of Computerized Natural Language Query Intent Dispatching

A specific example of a conversation utilizing computerized natural language query intent dispatching with the natural language conversation system (200) will now be discussed. This just an example, and many other variations are possible in accordance with the remainder of the disclosure herein, including the attached claims.

In the example, the main natural language processor (220) can receive an initial query (214) that states, "I want to order a cheese pizza," along with a conversation identifier (216). The main natural language processor (220) can determine whether the main natural language processor (220) can understand and respond to the initial query (214) with sufficient confidence, using its own natural language processing capabilities. If the main natural language processor (220) determines that it cannot do so, the main natural language processor (220) can forward the query (214) to a set of multiple extension natural language processors (232), some of which may be programmed to understand the query (214) with sufficient confidence and some of which may not be programmed to understand the query (214) with sufficient confidence. One of those may be an extension natural language processor (232) for a pizza ordering extension (230). Upon receiving the query (214), the extension natural language processor (232) for the pizza ordering extension (230) can return an "order pizza" intent (240) and a "cheese topping" entity (242). Other extension natural language processors (232) may also return other entities (242) in response to the query (214). The main natural language processor (220) can determine whether it has sufficient confidence in any of the returned intents (240). If not, the main natural language processor (220) can ask the client device for user input to select from among the intents (240). Also, if the main natural language processor (220) has sufficiently low confidence in all returned intents (240), it may provide its own default response (e.g., Web search results for the query (214)) without even asking for user input on the received intents (240).

Consider a scenario where the main natural language processor (220) selects the "order pizza" intent and matches the intent (240) with the conversation query processor (234) for the pizza ordering extension (230), so that the main natural language processor (220) selects the conversation query processor (234) for the pizza ordering extension (230) to handle the query (214). The main natural language processor (220) can send the "order pizza" intent (240) and a "cheese topping" entity (242) to the conversation query processor (234) for the pizza ordering extension (230), along with a conversation identifier (216) (which was received from a client device (210) along with the query (214)), and a masked user identifier (250).

The conversation query processor (234) can respond with an answer (218) stating, "What size do you want: small, medium, or large," along with the conversation identifier (216) and the masked user identifier (250). The conversation query processor (234) can also record a state of the conversation, which can be associated with the conversation identifier (216). The main natural language processor (220) can forward the answer (218) with the conversation identifier (216) to the client device (210). The client device (210) can respond with a second query (214), which states "Large", along with conversation identifier (216) for the conversation.

The main natural language processor (220) can receive the "Large" query (214), and can pass the query (214) to the extension natural language processor (232) for the pizza ordering extension (230). The main natural language processor (220) may recognize the ongoing conversation with the pizza ordering extension from the conversation identifier (216) and only forward the query (214) to the extension natural language processor (232) for the pizza ordering extension (230). Alternatively, the main natural language processor may also forward the query (214) to other extension natural language processors (232) and also consider their responsive intents, but favoring the intent from the pizza ordering extension (230). The extension natural language processor (232) for the pizza ordering extension can receive the conversation identifier (216) received from the main natural language processor (220) with the query (214), and access the representation of the state of the conversation that is maintained by the conversation query processor (234), recognizing that a pizza size is expected. Accordingly, the extension natural language processor (232) can forward the query (214) to a component for recognizing a pizza size statement. The extension natural language processor (232)

can then recognize the intent as "pizza size: large," and return this intent (240) to the main natural language processor (220).

The main natural language processor (220) can forward the "pizza size: large" intent (240) to the conversation query processor (234) along with the conversation identifier (216). The conversation query processor (234) can recognize that this completes the pizza order (such as by recognizing that all available slots for a pizza order data structure are filled). The conversation query processor (234) can complete and submit the pizza order, and can respond with an answer (218), reading "Your large cheese pizza has been ordered." The main natural language processor (220) can send this answer (218) on to the client device (210) for presentation on the client device (210).

III. Computerized Natural Language Query Intent Dispatching Techniques

Several computerized natural language query intent dispatching techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic.

Figure 3:
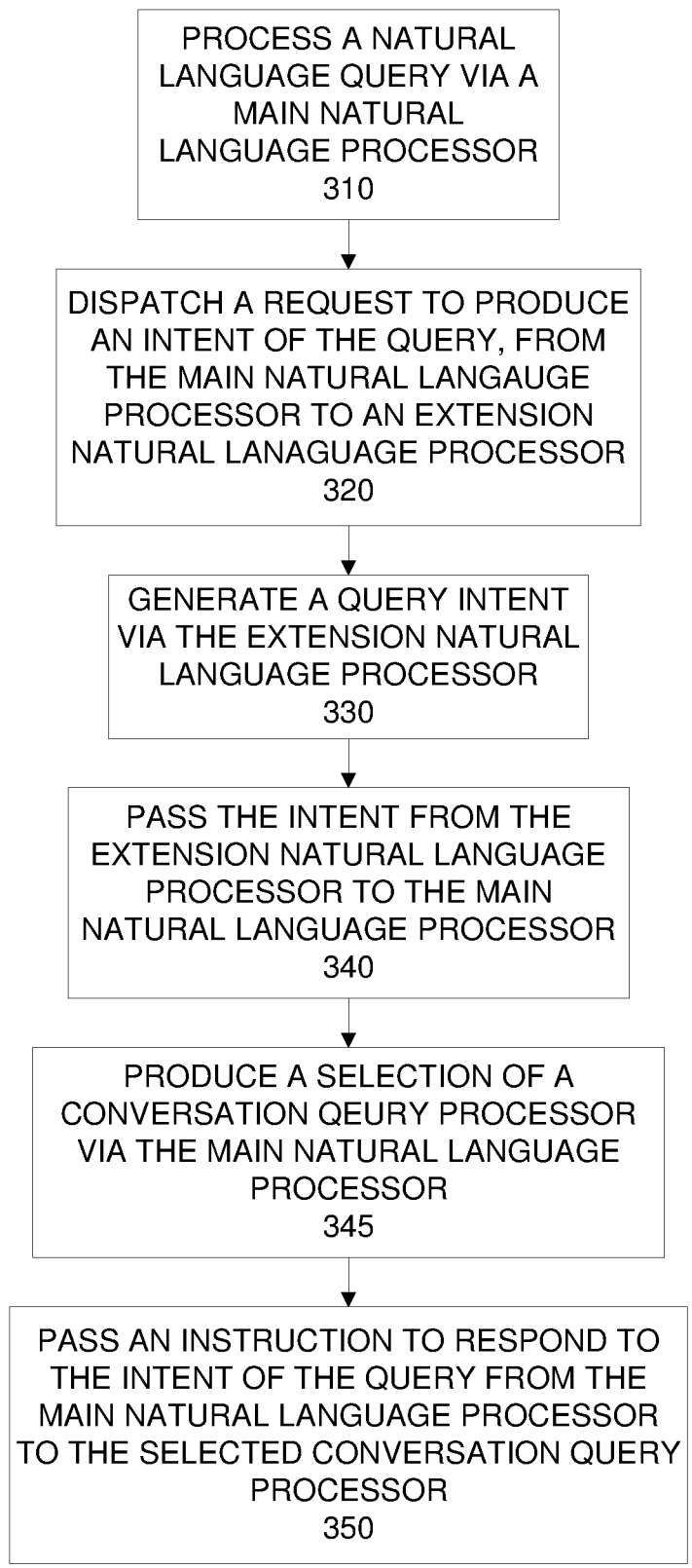
FIG. 3 is a flowchart of a computerized natural language query intent dispatching technique.

Referring to FIG. 3, a computerized natural language query intent dispatching technique will be described. The technique can include processing (310) a natural language query via a main natural language processor. The technique can also include dispatching (320) a request to produce an intent of the query, with the dispatching comprising dispatching from the main natural language processor to an extension natural language processor. The technique can further include generating (330) an intent of the query via the extension natural language processor in response to the dispatched request, with the generating of the intent being performed independently of the main natural language processor. The intent of the natural language query can be passed (340) from the extension natural language processor to the main natural language processor in response to the request to produce the intent of the query. The technique of FIG. 3 can also include producing (345), via the main natural language processor, a computer-readable selection of a conversation query processor for responding to the intent. Additionally, the technique can include passing (350) to the selected conversation query processor a computer-readable instruction to respond to the intent of the query, with the computer-readable instruction identifying the intent of the query. This technique discussed in this paragraph can be practiced with the features of the following paragraphs separately or in any combination of those features.

The technique of FIG. 3 may include receiving the natural language query from a computer client; receiving, via the main natural language processor, an answer to the intent of the query from the selected conversation query processor; and forwarding the answer from the main natural language processor to the computer client. The technique may further include modifying the answer via the main natural language processor to produce a modified answer (such as where the answer is augmented with graphical features, controls, etc.), where the forwarding of the answer can include forwarding the modified answer. Also the technique may further include producing the answer via the conversation query processor in response to the conversation query processor receiving the instruction to respond to the intent of the query. The acts may further include producing a computerized action requested in the query via the conversation query processor, with the action being different from and in addition to the answer.

The technique of FIG. 3 may include registering the extension natural language processor with the main natural language processor after the main natural language processor is operational and before the processing of the natural language query via the main natural language processor.

The dispatching (320) of the request to produce an intent of the query from the main natural language processor to the extension natural language processor can be part of dispatching a plurality of requests to produce an intent of the query from the main natural language processor to a plurality of extension natural language processors in a set of extension natural language processors. Also, the generating (330) of the intent of the query via the extension natural language processor can be part of generating a plurality of intents for the query via the plurality of extension natural language processors, with the generating of the intents being performed independently of the main natural language processor. The passing (340) of the intent of the natural language query to the main natural language processor can be part of passing the plurality of intents from the plurality of extension natural language processors to the main natural language processor. Also, in the technique of FIG. 3, the producing of the selection of the conversation query processor can include producing, via the main natural language processor, a computer-readable selection of the intent from the plurality of intents. The producing (345) of the computer-readable selection of the intent can include prioritizing the intents based on tiers of the extension natural language processors. For example, the tiers can include a first party extension natural language processor tier and a third party extension natural language processor tier. Also, the producing of the computer-readable selection of the intent can include ranking the intents based on one or more factors, where the one or more factors may include confidence values for the intents. However, the producing of the computer-readable selection of the intent comprises ranking the intents based on a plurality of different factors, which may include factors in addition to, or instead of, the confidence values. Additionally, multiple factors may be considered in producing the confidence values, as discussed above.

The extension natural language processor of the technique of FIG. 3 can be part of an extension that is separate from the main natural language processor. The technique may further include producing a masked user profile identification for a user profile associated with the natural language query, with the masked user profile identification being specific to the extension; and sending the masked user profile identification to the extension. For example, this may include sending the masked user profile identification to an extension natural language processor of the extension and/or to a conversation query processor of the extension.

Figure 4:
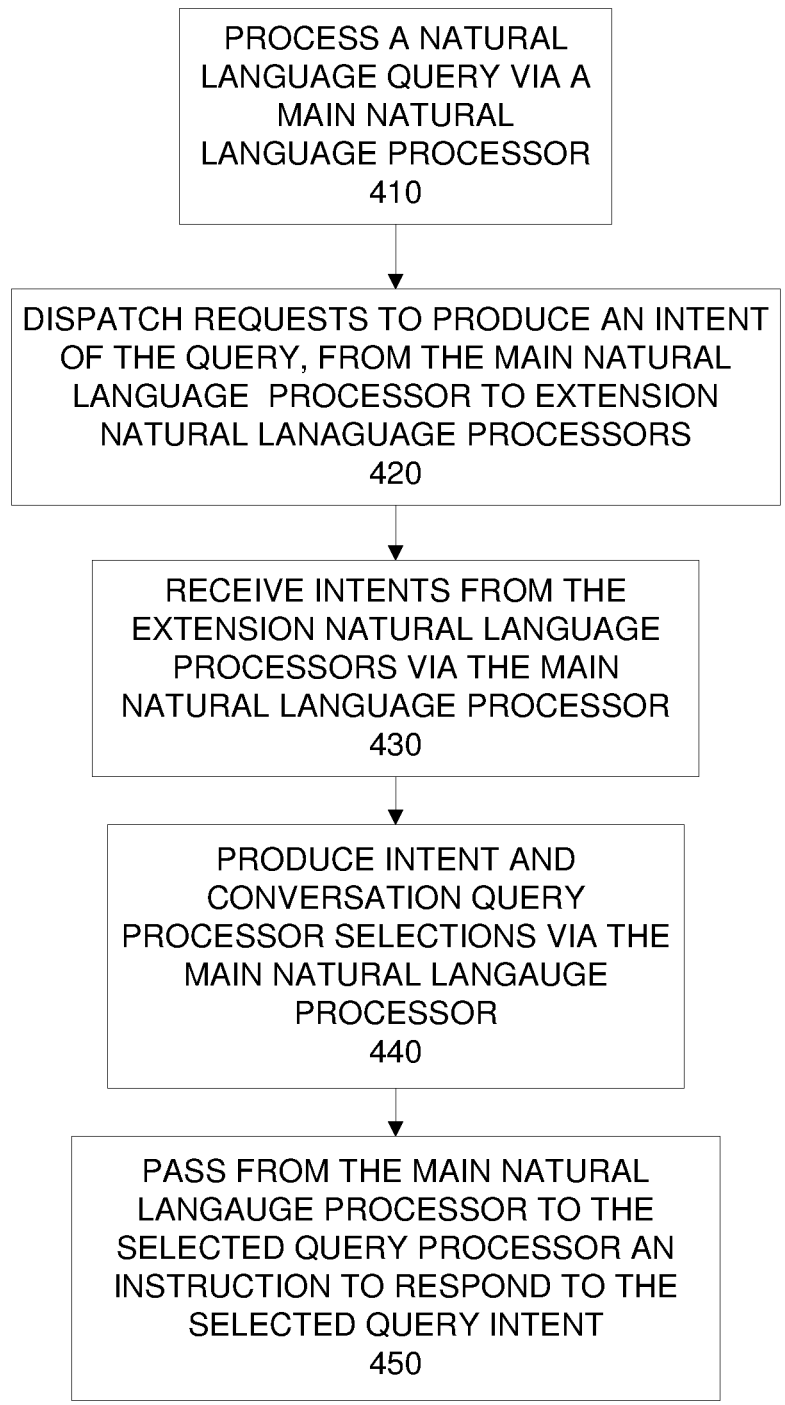
FIG. 4 is a flowchart of another computerized natural language query intent dispatching technique.

Referring to FIG. 4, another computerized natural language query intent dispatching technique will be described. The technique can include processing (410) a natural language query via a main natural language processor, with the processing comprising producing a plurality of requests to produce an intent of the query. The requests to produce the intent of the query can be dispatched (420) from the main natural language processor to a set of extension natural language processors, with the set of extension natural language processors each being configured to generate an intent of the query independently of the main natural language processor (other requests to produce an intent of the query may also be sent to other extension natural language processors that are not configured to generate an intent of the query). An intent of the natural language query can be received (430) from each of the extension natural language processors in the set in response to the sending of the requests to produce an intent of the extension natural language processor. A computer-readable selection of a selected intent of the received intents and a computer-readable selection of a selected conversation query processor matching the selected intent can be produced (440). A computer-readable instruction to respond to the selected intent of the query can be passed (450) from the main natural language processor to the selected conversation query processor. The computer-readable instruction can identify the selected intent of the query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer system comprising:
   at least one hardware processor; and
   memory comprising instructions stored thereon that when executed by at least one hardware processor cause at least one hardware processor to perform acts comprising:
      registering an extension natural language processor with a main natural language processor after the main natural language processor is operational;
      processing a natural language query via a main natural language processor after the registering of the extension natural language processor;
      dispatching a request to produce an intent of the query from the main natural language processor to an extension natural language processor, wherein the extension natural language processor is configured to determine an intent of the query;
      generating an intent of the query via the extension natural language processor in response to the dispatched request, with the generating of the intent being performed independently of the main natural language processor;
      passing the intent of the natural language query from the extension natural language processor to the main natural language processor in response to the request to produce the intent of the query;
      producing, via the main natural language processor, a computer-readable selection of a conversation query processor for responding to the intent; and
      passing to the selected conversation query processor a computer-readable instruction to respond to the intent of the query, with the computer-readable instruction identifying the intent of the query.

2. The computer system of claim 1, wherein the acts further comprise:
   receiving the natural language query from a computer client;
   receiving, via the main natural language processor, an answer to the intent of the query from the selected conversation query processor; and
   forwarding the answer from the main natural language processor to the computer client.

3. The computer system of claim 2, wherein the acts further comprise modifying the answer via the main natural language processor to produce a modified answer, and wherein the forwarding of the answer comprises forwarding the modified answer.

4. The computer system of claim 2, wherein the acts further comprise producing the answer via the conversation query processor in response to the conversation query processor receiving the instruction to respond to the intent of the query.

5. The computer system of claim 4, wherein the acts further comprise producing a computerized action requested in the query via the conversation query processor, with the action being different from and in addition to the answer.

6. The computer system of claim 1, wherein:
   the dispatching of the request to produce an intent of the query from the main natural language processor to the extension natural language processor is part of dispatching a plurality of requests to produce an intent of the query from the main natural language processor to a plurality of extension natural language processors in a set of extension natural language processors;
   the generating of the intent of the query via the extension natural language processor is part of generating a plurality of intents for the query via the plurality of extension natural language processors, with the generating of the intents being performed independently of the main natural language processor;
   the passing of the intent of the natural language query to the main natural language processor is part of passing the plurality of intents from the plurality of extension natural language processors to the main natural language processor; and
   the producing of the selection of the conversation query processor comprises producing, via the main natural language processor, a computer-readable selection of the intent from the plurality of intents.

7. The computer system of claim 6, wherein the producing of the computer-readable selection of the intent comprises ranking the intents based on one or more factors, with the one or more factors comprising confidence values for the intents.

8. The computer system of claim 6, wherein the producing of the computer-readable selection of the intent comprises ranking the intents based on a plurality of different factors.

9. The computer system of claim 6, wherein the producing of the computer-readable selection of the intent comprises prioritizing the intents based on one or more factors, with the one or more factors comprising tiers of the extension natural language processors.

10. The computer system of claim 9, wherein the tiers comprise a first party extension natural language processor tier and a third party extension natural language processor tier.

11. The computer system of claim 1, wherein the extension natural language processor is part of an extension that is separate from the main natural language processor, and wherein the acts comprise:
   producing a masked user profile identification for a user profile associated with the natural language query, with the masked user profile identification being specific to the extension; and sending the masked user profile identification to the extension.

12. A computer-implemented method, comprising the following acts:

processing a natural language query via a main natural language processor, with the processing comprising producing a request to produce an intent of the query;

dispatching the request to produce an intent of the query, with the request to produce the intent being dispatched from the main natural language processor to an extension natural language processor that is configured to generate an intent of the query independently of the main natural language processor, the dispatching of the request being part of dispatching a plurality of requests to produce the intent of the query, with the dispatching of the requests comprising dispatching from the main natural language processor to a plurality of extension natural language processors in a set of extension natural language processors;

receiving an intent of the natural language query from the extension natural language processor in response to the dispatching of the request to produce an intent of the extension natural language processor, the receiving of the intent being part of receiving a plurality of intents for the query from the plurality of extension natural language processors;

processing the intent via the main natural language processor, with the processing comprising producing a computer-readable selection of a conversation query processor, the producing of the selection of the conversation query processor comprising producing a computer-readable selection of the intent from the plurality of intents; and passing to the selected conversation query processor a computer-readable instruction to respond to the intent of the query, with the computer-readable instruction identifying the intent of the query.

13. The method of claim 12, wherein the acts further comprise generating the intent of the query via the extension natural language processor, with the generating of the intent being performed independently of the main natural language processor.

14. The method of claim 12, wherein the acts further comprise:

receiving the natural language query from a computer client;

receiving, via the main natural language processor, an answer to the intent of the query from the selected conversation query processor; and forwarding the answer from the main natural language processor to the computer client.

15. The method of claim 12, wherein the acts further comprise registering the extension natural language processor with the main natural language processor after the main natural language processor is operational and before the processing of the natural language query via the main natural language processor.

16. The method of claim 12, wherein the producing of the computer-readable selection of the intent comprises receiving and processing a computer-readable user input selection of the selected intent.

17. The method of claim 12, wherein the extension natural language processor is part of an extension that is separate from the main natural language processor, and wherein the acts comprise:

producing a masked user profile identification for a user profile associated with the natural language query, with the masked user profile identification being specific to the extension; and sending the masked user profile identification to the extension.

18. One or more computer-readable memory having computer-executable instructions embodied thereon that, when executed by at least one processor, cause at least one processor to perform acts comprising:

processing a natural language query via a main natural language processor, with the processing comprising producing a plurality of requests to produce an intent of the query;

dispatching the requests to produce an intent of the query, with the requests to produce the intent being dispatched from the main natural language processor to a set of extension natural language processors, and with the set of extension natural language processors each being configured to generate an intent of the query independently of the main natural language processor;

receiving, via the main natural language processor, an intent of the natural language query from each of the extension natural language processors in the set in response to the dispatching of the requests to produce an intent of the extension natural language processor;

producing, via the main natural language processor, a computer-readable selection of a selected intent of the received intents and a computer-readable selection of a selected conversation query processor matching the selected intent; and passing from the main natural language processor to the selected conversation query processor a computer-readable instruction to respond to the selected intent of the query, with the computer-readable instruction identifying the selected intent of the query.

19. The one or more computer-readable memory of claim 18, wherein the acts further comprise registering the extension natural language processor with the main natural language processor after the main natural language processor is operational and before the processing of the natural language query via the main natural language processor.

20. The one or more computer-readable memory of claim 18, wherein the producing of the computer-readable selection of the intent comprises receiving and processing a computer-readable user input selection of the selected intent.

* * * * *